Jan. 31, 1950 — W. C. SCHROEDER — 2,495,777
PILOTAGE COMPUTER
Filed July 12, 1946
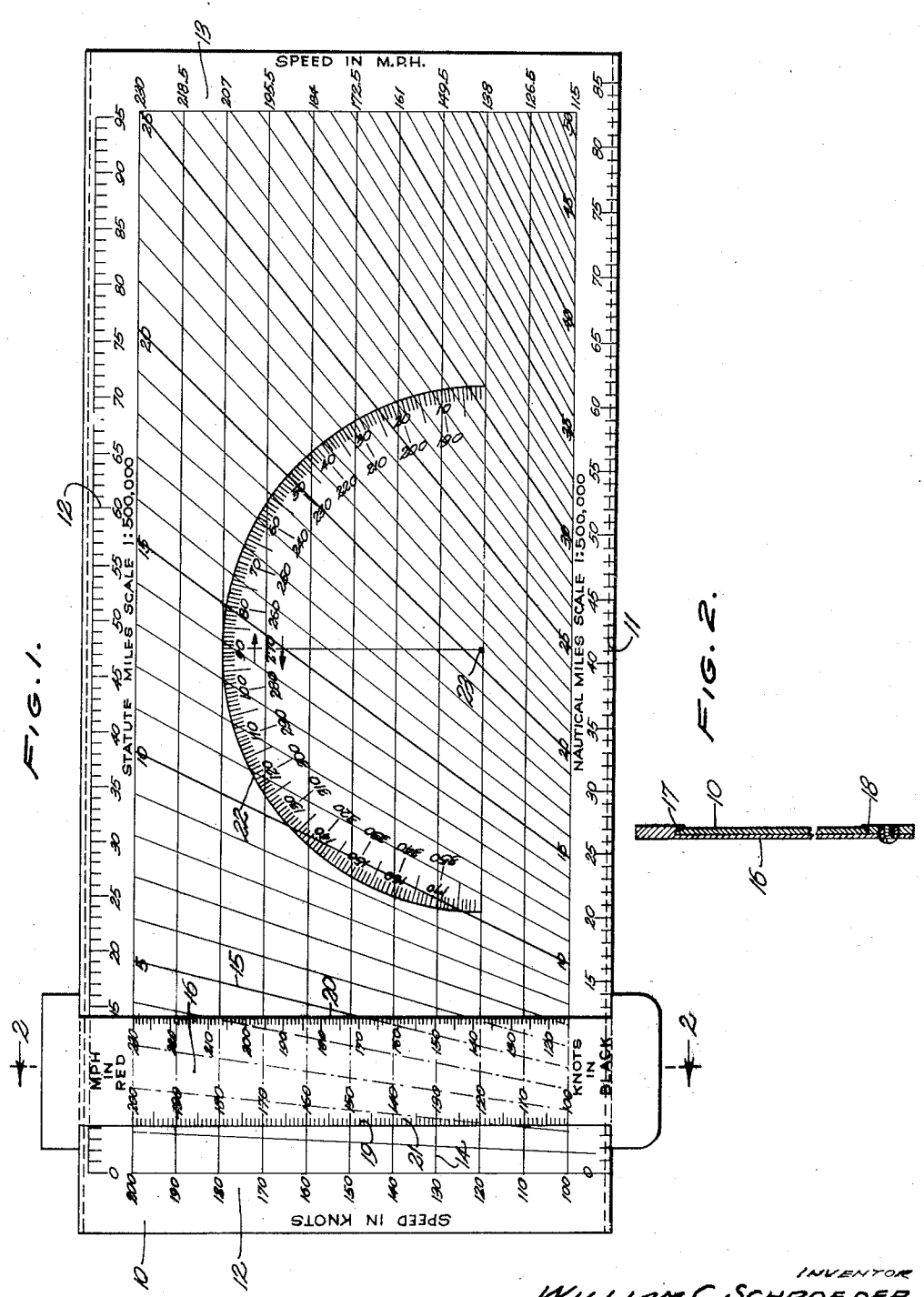
INVENTOR
WILLIAM C. SCHROEDER Patented Jan. 31, 1950

2,495,777

UNITED STATES PATENT OFFICE 2,495,777

PILOTAGE COMPUTER

William C. Schroeder, United States Army, Hackettstown, N. J.

Application July 12, 1946, Serial No. 683,196

3 Claims. (Cl. 235—61)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to navigation instruments, and may be designated a pilotage computer.

An object of the invention is to provide a navigation instrument adapted to be used in conjunction with sectional maps wherein the meridians are all disposed parallel to each other and vertically arranged on the map. Maps of this character are conventional and are used by navigators on aircraft.

More specifically, an object of the invention is to provide a navigation instrument consisting of a section or panel of transparent material which may be positioned on the map and the map read therethrough and which has on the panel one or more distance scales and one or more speed scales arranged at right angles to the distance scales, the speed scales having lines extending across the panel parallel to the distance scale and being traversed by time lines that cross the speed lines at points equal to or proportional to distances as measured on the distance scale per units of time. A slide is movable across the panel at right angles to the distance scales and has speeds graduated thereon and superimposed upon the panel is a protractor or portion thereof the center of which is indicated. With an instrument so constructed most, if not all, of the normal navigator's pilotage calculations can be quickly solved in applying the instrument to a conventional sectional map.

With the foregoing and other objects in view, which will be made manifest in the following detailed description and specifically pointed out in the appended claims, reference is had to the accompanying drawings for an illustrative embodiment of the invention, wherein:

Figure 1 is a top plan view of the improved pilotage computer embodying the present invention; and Figure 2 is a sectional view taken substantially upon the line 2—2 upon Fig. 1.

Referring to the accompanying drawings wherein similar reference characters designate similar parts throughout, the improved navigational instrument consists of a flat panel 10 of transparent material such as Plexiglas. This panel is rectangular in form and along its longer edges it preferably is equipped with distance scales 11 and 12.

In the preferred form of construction the scale 11 is in nautical miles equal to or directly proportional to the scale of the sectional map with which the instrument is designed to be used. The scale 12 which may be colored a distinctive color such as red to readily distinguish it from the scale 11 which is preferably colored black, may be in statute miles, but on the same proportional scale as the scale 11. Along the shorter marginal edges of the panel there are speed scales constituting the ordnance of time-speed-distance graph that is on the panel. The speed scale indicated at 12 may be in knots and its opposed speed scale 13 may be in miles per hour. As most airplane speeds are from 100 to 200 knots only that portion of the speed scale from 100 to 200 knots is applied to the panel. However, it will be appreciated that the invention is in no way restricted to the use of such a shortened speed scale. The speed scale 13 in miles per hour is in direct proportion to the speed scale 12 in knots. Horizontal lines 14 are drawn across the panel opposite units on the speed scale and constitute speed lines. Time lines 15 which are of progressively decreasing inclination from left to right across the panel are drawn across the speed lines so as to traverse them at points equal to or directly proportional to the distances travelled per units of time as measured by the distance scale. Thus for example, the time line 15 indicating an elapsed time of five minutes traverses the speed line of 180 knots vertically above the 15 graduation on the scale 11 to indicate that at a speed of 180 knots the aircraft will have traversed fifteen nautical miles in five minutes. This same time line traverses the speed line of 120 knots vertically above the 10 graduation on the distance scale 11 to indicate that at a speed of 120 knots ten nautical miles will have been traversed in five minutes. In a similar manner the time line 15 indicating twenty minutes of elapsed time traverses the speed line 180 knots vertically above the 60 graduation on the distance scale 11 to indicate that at a speed of 180 knots the aircraft will have traversed a distance of sixty nautical miles. Similarly, this same time line traverses the speed line 120 vertically above graduation 40 on the distance scale 11 to indicate that at a speed of 120 knots the aircraft will have travelled forty nautical miles in twenty minutes. All of the various time lines 15 which are thus drawn will traverse the speed line 14 at points directly proportional and preferably equal to distances traversed per their respective units of time at the speeds indicated.

A slide 16 is provided which is likewise formed of transparent material and this slide is provided with recesses 17 and 18 which receive the edges of the panel enabling the slide to be moved horizontally across the panel 10. This slide presents edges 19 and 20 that are parallel to each other and which are at right angles to the longer edges of the panel. Along the edge 19 there is a speed scale 21 that may be finely graduated on the same scale as the speed scale 12 and along the edge 20 there is a finely graduated speed scale equal to the speed scale 13. The two speed scales on the slide being thus in knots and in miles per hour are preferably colored black and red, respectively, to readily distinguish them. Superimposed on the panel is a protractor 22 the center of which is indicated at 23. Preferably the center of the protractor is in the nature of a small perforation through the panel. While only a half of a compass rose is used as the protractor in the construction illustrated it is within the scope of the invention to use a complete compass rose if desired.

The uses of such a navigational instrument will be readily understood by skilled nagivators. However, as illustrative of the manner in which simple navigational problems may be solved therewith the following explanation may be made: It will, of course, be appreciated that it is possible to instantly convert nautical miles into statute miles by positioning the slide opposite a graduation on the scale 11 and reading the corresponding statute miles directly on the scale 12. Similarly, it is possible to instantly convert speeds in knots into speeds in miles per hour by reading across the panel from scale 12 to scale 13.

Suppose that a flight is to be taken from a point of departure on a sectional map to a given destination, that is from point A, the point of departure, to point B, the destination. Any convenient speed line 14 is aligned along the intended course from A to B and the panel moved over the map until the perforation 23 is over a meridian. The course angle from A to B may be instantly read off of the protractor 22. Using either of the distance scales 11 or 12, the distance between A and B may be instantly determined either in nautical miles or statute miles as desired. If, for example, the course angle from A to B was read on the protractor 22 as being 43° and the direction and the velocity of the wind are unknown the pilot may be given a magnetic heading of 36°. The progress of the airplane is followed along the sectional, along the air speed line of the plane which may be 150 knots. Suppose that in twenty minutes the airplane passes over a point C somewhat off of the straight line joining A and B, the panel 10 is then positioned on the map in such a manner that the beginning of the speed line 150 knots is over point A and the line joins A and C. The slide 16 is then positioned to point C. The twenty minute line is then followed up to the point where it passes beneath the slide and may show a ground speed rate on the scale 21 of 164 knots. Off the distance scale 11 on the bottom of the panel the slide may indicate a distance of 54½ nautical miles from A to C. By sliding the panel so that the center 23 to a meridian the "track made good" of 49° on the protractor may be read.

To find a wind the theoretical heading of 43° may be drawn on the sectional map and using the pilotage computer the elapsed time of twenty minutes of true air speed may be read as being fifty miles by positioning the edge of the slide opposite the point where the twenty-minute time line traverses the 150 knots speed line and reading the slide against the distance scale 11. The distance of fifty miles is then laid out from the point of departure along the true heading drawn on the map and the wind vector is drawn from such point to the point C. This wind vector may have its direction determined from the protractor and its speed determined from the distance scale used to measure the length of the vector. The correction from the point C to the point B may then be made by using the protractor and by sighting along the computer at the previous ground speed determined to be 164 knots, a time to the destination may be readily read.

The above problem is merely illustrative of one manner in which the improved computer may be used. The ability however to instantly read from the graph distance from speed and elapsed time or time from speed and distance greatly facilitates the solution of many navigational problems.

Various changes may be made in the details of construction without departing from the spirit and scope of the invention as defined by the appended claims.

I claim:

1. A navigational instrument comprising a panel of transparent material having on two opposite edges distance scales in nautical miles and statute miles respectively and having on the other two opposite edges thereof scales in speeds in knots and in miles-per-hour respectively, parallel speed lines between said last named edges and time lines traversing the speed lines at points indicative of the distance traveled per units of time as indicated by the distance scales, a protractor on the panel having its center indicated thereon, and a slide movable over the panel having speeds in knots and miles-per-hour graduated thereon.

2. A navigational instrument comprising a substantially rectangular panel of transparent material having parallel speed lines extending thereacross and terminating short of both side edges of the panel, there being speed in knots scale on one side edge of the panel having numerals registering with the parallel lines, there being a speed in miles per hour scale on the opposite side edge having numerals registering with the parallel lines, the top and bottom edges of the panel having scales in statute miles and nautical miles, respectively, time lines traversing the speed lines at points indicative of the distance traveled per units of time as indicated by the distance scales, there being time scales having numerals in registry with at least some of the time lines and located adjacent the top and bottom edges of the panel, and a slider having side edges extending vertically completely across the panel, the slider having end portions extending over and behind the panel for guiding the slider across the panel, one vertical edge of the slider having a scale in miles per hour, the last named scale having numerals out of registry with the parallel speed lines, the opposite vertical edge of the slider having a scale in knots registering with the parallel speed lines.

3. A navigational instrument comprising a substantially rectangular panel of transparent material having parallel speed lines extending thereacross and terminating short of both side edges of the panel, there being speed in knots scale on one side edge of the panel having numerals registering with the parallel lines, there being a speed in miles per hour scale on the opposite side edge having numerals registering with the parallel lines, the top and bottom edges of the panel having scale in statute miles and nautical miles, respectively, time lines traversing the speed lines at points indicative of the distance traveled per units of time as indicated by the distance scales, there being time scales having numerals in registry with at least some of the time lines and located adjacent the top and bottom edges of the panel, a slider having side edges extending vertically completely across the panel, the slider having end portions extending over and behind the panel for guiding the slider across the panel, one vertical edge of the slider having a scale in miles per hour, the last named scale having numerals out of registry with the parallel speed lines, the opposite vertical edge of the slider having a scale in knots registering with the parallel speed lines, and a protractor on the panel having its center indicated thereon.

WILLIAM C. SCHROEDER.

REFERENCES CITED

The following references are of record in the file of this patent:

UNITED STATES PATENTS

| Number | Name | Date |
|---|---|---|
| 1,930,478 | Jones | Oct. 17, 1933 |
| 1,985,907 | Weems | Jan. 1, 1935 |
| 2,179,531 | Trapnell | Nov. 14, 1939 |
| 2,219,429 | Costerberg | Oct. 29, 1940 |

OTHER REFERENCES

"Graphical Charts," by John B. Peddle, published by McGraw-Hill Book Co., Inc., 239 W. 39th St., N. Y., in 1919. (Copy on file in the Patent Office Library.)